United States Patent Office 3,523,933
Patented Aug. 11, 1970

3,523,933
PRODUCTION OF PARTIALLY ALCOHOLYZED
VINYL ESTER POLYMERS
Harold K. Inskip, Tonawanda, N.Y., assignor to E. I. du Pont de Nemours and Company, Wilmington, Del., a corporation of Delaware
No Drawing. Filed Sept. 29, 1967, Ser. No. 671,575
Int. Cl. C08f 3/50, 3/34
U.S. Cl. 260—89.1                                   6 Claims

ABSTRACT OF THE DISCLOSURE

Partially alcoholyzed vinyl ester polymers are produced by reacting a vinyl ester polymer with a hydrolytic alcohol in the presence of an acid or a base alcoholysis catalyst, and stopping the reaction when from 25 to 60% of the ester groups of the polymer have been replaced by hydroxyl groups, by rapidly mixing with the reaction mixture, a neutralizing agent and sufficient water, e.g., about 5 to 55%, based on the reaction mixture, to maintain the reacted polymer product as a mobile solution.

BACKGROUND OF THE INVENTION

Products formed by the partial or complete alcoholysis of vinyl ester polymers such as polyvinyl acetate are manufactured commercially and find applications as films, adhesives, sizes, binders, coatings and the like. Such products vary considerably in their properties and uses depending upon the extent to which they have been alcoholyzed, i.e., the extent to which the ester groups of the parent vinyl ester polymer have been replaced by hydroxyl groups. Products which are about 70% to nearly 100% alcoholyzed are sold in large quantities as dry powders or granules which are readily dissolved in hot or cold water prior to use. Products which are about 50% alcoholyzed are also available commercially, but despite their many useful properties they have not gained wide acceptance, partly because they are more expensive to manufacture and hence are available only at significantly higher prices.

Partially alcoholyzed polyvinyl acetate is most commonly produced as a dry solid by treating a solution of polyvinyl acetate in a hydrolytic alcohol such as methanol with an acid or a base catalyst in a reaction vessel provided with a heavy-duty mixer. The alcoholysis reaction proceeds at a rate which is dependent upon the temperature, and the catalyst and alcohol concentrations. The alkyl acetate corresponding to the hydrolytic alcohol employed is formed as a by-product.

During the initial part of the reaction, little or no change in the appearance of the reaction mixture occurs, since the alcohol remains a good solvent for polyvinyl acetate which is only slightly alcoholyzed. However, when the polymer becomes about 25 to 30% alcoholyzed, the solution becomes quite viscous and the power input required to maintain good mixing increases. The viscosity of the mixture continues to rise at an increasing rate until at some point after the polymer is about 40 to 60% alcoholyzed, the entire mass turns to a tough gel, at which point the power input requirement is high. As the alcoholysis proceeds further with good mixing being maintained, the gel breaks up, and gradually as the degree of alcoholysis approaches about 70%, the polymer precipitates as a white powder and a separate liquid phase consisting of the hydrolytic alcohol and the by-product alkyl acetate is formed. The reaction then continues in this mobile two-phase system until its completion or until it is terminated at some desired intermediate point by neutralization of the catalyst. Isolation of the alcoholyzed product from the slurry is relatively simple and economical, since the solid phase can be separated by filtration or centrifugation and the remaining volatiles can be rapidly removed from the separated product in a drier under mild conditions. The exact extent of alcoholysis in which the above phenomena occur varies somewhat depending upon the particular vinyl ester polymer employed, its molecular weight and concentration, the particular hydrolytic alcohol employed and its concentration, and the reaction temperature.

It will be readily apparent from the above why polyvinyl acetate, which is only about 50% alcoholyzed, is difficult and expensive to manufacture. At this point in the alcoholysis reaction, the reaction mixture is very viscous and the polymer is near to or in the gel state, and the first problem which arises is that of effectively neutralizing the catalyst. This is because it is difficult to obtain rapid mixing of a liquid containing the neutralizing agent and the viscous polymer solution or gel, and, as a result, the product tends to become heterogeneous with respect to the degree of alcoholysis. Thus, those portions of the mass which the neutralizing agent reaches last tend to be more highly alcoholyzed than those that are rapidly first neutralized.

A second problem encountered in producing about 50% alcoholyzed product involves the handling of the product. Thus, when the reaction mixture is viscous and the polymer is near to or in the gel state, there is no convenient and entirely satisfactory way of removing it from the reactor or of handling it subsequent to its removal. For lack of a better way, common practice has been simply to agitate the neutralized mass while heat is applied to the vessel to remove the volatile solvents. This is an uneconomical practice because these polymers tend to hold on to the solvent tenaciously and the diffusion path of the solvent molecules is long, making the drying operation of several fold greater duration than the alcoholysis operation. Furthermore, the dry product finally obtained is usually coarse and non-uniform, resembling popcorn in appearance. If the drying operation is accelerated by raising the drying temperature, the product generally becomes degraded, especially in color and solubility.

The above difficulties encountered in the preparation of polymers which are about 50% alcoholyzed are also encountered to a greater or lesser extent in preparing polymers which are 25 to 60% alcoholyzed. The present invention is based upon the discovery of a very practical and simple way of overcoming all of these difficulties.

SUMMARY OF THE INVENTION

Polymers of vinyl esters of 1 to 4 carbon aliphatic carboxylic acids are partially alcoholyzed by reacting a solution of the vinyl ester polymer with a hydrolytic alcohol in the presence of an acid or a base alcoholysis catalyst, and stopping the reaction when not more than 60%, e.g., 25 to 60%, preferably 40 to 55%, of the ester groups of the polymer have been replaced by hydroxyl groups, by rapidly mixing with the reaction mixture a neutralizing agent for the catalyst and an amount of water, generally equal to about 5 to 55% of the weight of the reaction mixture, which is sufficient to facilitate such rapid mixing and to maintain the partially alcoholyzed polymer product as a mobile solution.

DETAILED DESCRIPTION AND PREFERRED EMBODIMENTS

The invention is based upon the discovery that the reaction mixture containing the partially alcoholyzed vinyl ester polymer can be effectively neutralized so as to stop the reaction at the desired degree of partial alcoholysis if the agent for neutralizing the catalyst is mixed with the reaction mixture together with an amount of water which is sufficient to facilitate rapid mixing of the neutralizing agent with the reaction mixture and to maintain the partially alcoholyzed polymer product in the form of a mobile solution. The amount of water required for this purpose will vary somewhat depending upon the particular vinyl ester polymer employed, its molecular weight, its concentration in the starting polymer solution, and also the degree of partial alcoholysis desired. In some cases, amounts of water as small as 5% may be sufficient and seldom will there need be added an amount of water greater than 55%, based upon the weight of the reaction mixture prior to the addition of the water. Most generally, an amount of water ranging from 10 to 50% will be used. When the neutralization is effected by mixing the neutralizing agent and an amount of water as indicated above with the reaction mixture, the alcoholysis reaction is stopped immediately, and the previously viscous reaction mixture will be transformed into a mobile product solution of the partially alcoholyzed polymer in a mixture of water, the solvent in which the starting polyvinyl ester was dissolved, and the alkyl acylate formed as a by-product. This method of terminating the partial alcoholysis reaction avoids the necessity of employing heavy-duty mixing devices such as kneaders and results in the obtainment of the partially alcohlyzed product as a mobile product solution which can be readily withdrawn from the reactor, which does not gel on standing, and is usable as such.

The vinyl ester polymers which can be partially alcoholyzed in accordance with the invention include the homopolymers of vinyl esters of 1 to 4 carbon aliphatic carboxylic acids, examples of which are the polyvinyl formates, the polyvinyl acetates, the polyvinyl propionates and the like. Also usable as starting vinyl ester polymers are the copolymers of such vinyl esters with each other and also with other comonomers that are copolymerizable therewith, providing the amount of the other copolymerized comonomers is insufficient to change profoundly the solubility characteristics of the polymer or its partially alcoholyzed derivative as compared with the solubility characteristics of the corresponding vinyl ester homopolymer and its partially alcoholyzed derivative. Examples of such copolymers are the copolymers of such vinyl esters with up to about 15%, based upon the copolymer weight, of ethylene; up to about 5% of other alpha-olefins such as propylene, hexene, decene and octadecene; up to about 15% of an ethylenically unsaturated acid such as maleic, fumaric, acrylic and methacrylic acids; up to about 15% vinyl chloride; up to about 30% N-vinyl pyrrolidone or a lower alkyl (1 to 4 carbons) maleate, fumarate, acrylate or methacrylate. The preferred starting vinyl ester polymers are the homopolymers of the above vinyl esters, and of these, the most preferred are the various vinyl acetate homopolymers, i.e., the polyvinyl acetates, since they are the cheapest and the most important and most readily available commercially.

The hydrolytic alcohol may be any alcohol which can be effectively reacted with the vinyl ester polymer in the presence of an acid or a base alcoholysis catalyst to achieve replacement of ester groups of the polymer with hydroxyl groups. Examples of such hydrolytic alcohols are the 1 to 4 carbon primary aliphatic alcohols such as methanol, ethanol and propanol. The preferred alcohols are methanol and ethanol with methanol being the most preferred.

The reaction between the vinyl ester polymer and the hydrolytic alcohol is effected using a solution of the vinyl ester polymer, preferably in an excess of the hydrolytic alcohol over that required to give the desired degree of alcoholysis. Other solvents for the vinyl ester polymer may be employed, examples being ketones such as acetone and methyethyl ketone; hydrocarbons such as benzene, toluene, and xylene; and cyclic ethers such as 1,4-dioxane. However, if such other solvents are used, it is preferred that they be employed merely as supplemental solvents along with an excess of the hydrolytic alcohol which will constitute the primary solvent. The concentration of the vinyl ester polymer in the solution thereof should generally range from 5 to 80% by weight, but preferably will range from 20 to 65%. Thus, the initial vinyl ester polymer concentration may be varied considerably and, in general, the exact concentration employed will depend somewhat upon the particular vinyl ester polymer employed and its molecular weight, and somewhat upon the degree of alcoholysis desired for the final partially alcoholyzed polymer product.

The alcoholysis catalyst employed may be any of the strong acids known to catalyze the alcoholysis of vinyl ester polymers, examples of such acids being sulfuric acid, hydrogen chloride and sulfonic acids. When an acid catalyst is used, the neutralizing agent employed to terminate the reaction when the desired degree of alcoholysis has been achieved may be any alkaline reacting substance which is soluble in water and is effective to neutralize the acid catalyst. Examples of such neutralizing agents are the alkali metal hydroxides, ammonia, and the water soluble alkaline reacting salts such as sodium carbonate, trisodium phosphate, and the like. The preferred alcoholysis catalysts are base catalysts of the type which are well-known to be effective in catalyzing such alcoholysis reactions. The most common of such base catalysts are the alkali metal hydroxides and the alkali metal alcoholates which are soluble in the alcoholysis mixture. Of these, those most preferred are the alkali metal alcoholates of the hydrolytic alcohol employed. Since the preferred hydrolytic alcohol is methanol, the most preferred catalysts are the alkali metal methylates, particularly sodium methylate. When a base catalyst is used, the neutralizing agent employed to terminate the reaction when the desired degree of alcoholysis has been achieved may be any water soluble acid reacting material which will actively neutralize the base catalyst. Examples of such neutralizing agents are sulfuric acid, hydrochloric acid, phosphoric acid and water soluble acid salts such as sodium bisulfate. Also usable are the weakly acidic organic acids such as acetic acid and propionic acid. Of such neutralizing agents, the most preferred is acetic acid because it is a highly effective and relatively innocuous acid whose handling does not present severe corrosion problems. Regardless of the neutralizing agent employed, whether it be an acid reacting or a base reacting material, the amount thereof used should be at least stoichiometrically equal to the amount of the alcoholysis catalyst employed so as to assure complete inactivation of the catalyst and termination of the reaction. If the neutralizing agent is a strong acid or base, it should be used in the stoichiometric amount to neutralize the alcoholysis catalyst. If it is a weak acid or base such as acetic acid or ammonium hydroxide, it may be used in slight excess.

The alcoholysis catalyst, whether acid or base, will generally be employed in the reaction mixture at a concentration of from about 0.01 up to about 5% by weight, the preferred concentrations ranging from about 0.02 to 1% by weight of reaction mixture.

The alcoholysis reaction should be effected under essentially anhydrous conditions, by which is meant that the reaction mixture will contain not more than about 1% water and preferably not more than 0.2% water by weight. The alcoholysis reaction may be effected at any of the commonly employed temperatures at which catalyzed alcoholysis of vinyl ester polymers are carried out, temperatures ranging from 0 to 100° C. being illustrative. Most generally, however, temperatures ranging from about 45° C. up to the atmospheric reflux temperature of the alcoholysis mixture will be preferred.

When the alcoholysis reaction has proceeded to the desired extent, it is terminated abruptly by rapidly mixing with the reaction mixture, the agent for neutralizing the catalyst, and water as indicated previously. The water and the neutralizing agent may be added separately to the reaction mixture for this purpose, but most generally the neutralizing agent will be predissolved in the water to be employed and the resulting solution will then be added to the agitated reaction mixture.

Termination of the reaction in the above manner should be effected before alcoholysis has proceeded to a heavy gel state requiring heavy duty mixing as by a kneader. Generally, the alcoholysis will be stopped before not more than about 60%, e.g., 25 to 60% and preferably 40 to 55%, of the ester groups have been replaced by hydroxyl groups. When stopping the alcoholysis reaction in the presence of water in accordance with the invention, the need for heavy duty mixing equipment such as kneaders is avoided and the partially alcoholyzed product is obtained directly and economically as a usable mobile solution in a solvent comprising excess hydrolytic alcohol, water, and by-product alkyl acylate.

In one embodiment of the invention, a batch of a vinyl ester polymer solution in an excess of the hydrolytic alcohol is brought to the desired temperature under agitation and the alcoholysis catalyst is then added. The reaction starts immediately and is permitted to continue under agitation until the desired degree of alcoholysis has been achieved, whereupon a water solution of the neutralizing agent is rapidly mixed with the reaction mixture to stop the reaction and leave as product a solution of the partially alcoholyzed polymer in a mixture of the hydrolytic alcohol, water and by-product alkyl acylate. The alcoholysis can be effected continuously, however, by continuously mixing the solution of the vinyl ester polymer in the hydrolytic alcohol with the catalyst and immediately passing the resulting mixture continuously through a plug flow type reactor maintained at the desired temperature with the length of the reactor corresponding to the residence time required to achieve the desired degree of partial alcoholysis. The effluent stream from the plug flow reactor is then passed continuously to a mixing device where it is immediately mixed with the water solution of the neutralizing agent to stop the alcoholysis reaction at that point.

As indicated previously, the preferred solvent for the starting polyvinyl ester is an excess of the hydrolytic alcohol, and when using such a solvent the solvent for the partially alcoholyzed product obtained when the reaction is terminated will be a mixture of the starting hydrolytic alcohol, the by-product alkyl acylate and water. Thus, when starting with a methanol solution of polyvinyl acetate, the partially alcoholyzed polymer product will be dissolved in a mixture of methanol, methyl acetate and water. The product solution may, of course, be concentrated or even dried if desired. Most generally, however, it will be used as such or in a somewhat concentrated solution form readily obtainable by distilling off part of the organic components of the solvent mixture. If it is desired to replace the original solvent for the partially alcoholyzed polymer with a higher boiling solvent, the latter solvent may be added in the desired amount to the original product solution following which the original alcohol and/or by-product ester component of the solvent can be distilled off to leave a solution of the polymer product in a mixture of water and the higher boiling solvent. Examples of such higher boiling solvents are ethylene glycol, propylene glycol, ethylene glycol monoethyl ether, diethylene glycol monoethyl ether, the acetates of such monoethyl ethers, dipropylene glycol and isopropyl alcohol, when the hydrolytic alcohol is methanol.

The method of the invention is illustrated by the following examples in which all concentrations expressed as percentages are by weight.

Example 1

In a 500-ml. round bottomed flask fitted with a paddle stirrer, a condenser and a dropping funnel was placed 55 g. of a 45% solution of polyvinyl acetate in methanol. The polyvinyl acetate was of a type which when completely hydrolyzed gave a polyvinyl alcohol having a solution viscosity of 30 cp. (4% solution in water at 20° C.; Hoeppler viscosimeter). The solution was heated in a water bath to the reflux temperature with agitation. To it was then added 3 g. of an 11% solution of sodium methylate in methanol plus 15 g. of methanol. After 65 seconds the mixture began to thicken rapidly, and to it was then added 0.5 g. of acetic acid in 36 g. of water. The slightly hazy, viscous solution immediately thinned down to a clear mobile solution. The reflux condenser was replaced by a take-off condenser, and stirring was continued and the bath temperature raised. The mixture was distilled until the boiling point rose to 70° C. during which period about 23 g. of distillate, chiefly methanol and methyl acetate, was removed. The solution was then cooled to room temperature. Its polymer content was 21.6%. Its viscosity (Brookfield LVF Viscometer; No. 4 spindle; 30 r.p.m. 25° C.) was 11,460 cp. A portion of the solution was dried under an infrared lamp. The saponification number of the clear, tough film obtained was 405, indicating a degree of alcoholysis of 54.4%.

Example 2

In the manner described in Example 1, a solution of 281 g. of an identical polyvinyl acetate solution was diluted with 75 g. of methanol and to the gently boiling mixture was added 15 g. of an 11% solution of sodium methylate in methanol, with agitation. After 45 seconds the mixture had become highly viscous and to it was added 2 g. of acetic acid in 180 g. of water. It became clear and much less viscous immediately. A total of 98 g. of solvent was removed by distillation, during which the boiling point rose to 74° C. The balance of the solution was cooled and bottled. Its polymer content was 23.7% and its viscosity (Brookfield LVF Viscometer; No. 4 spindle; 30 r.p.m., 25° C.) was 11,620 cp. The saponification number of the polmer isolated from the solution was 481, corresponding to a degree of alcoholysis of 41%.

Example 3

In a 2-liter resin flask fitted with an anchor agitator, a reflux condenser and a thermometer was placed 800 g. of a 35.5% solution of polyvinyl acetate in methanol. The polyvinyl acetate was of a type which when completely hydrolyzed gave a polyvinyl alcohol having a solution viscosity of 60 cps. (4% solution in water at 20° C.; Hoeppler viscosimeter). The solution was heated to 55° C., with agitation, in a water bath, then to it was added 50 g. of a 0.5% solution of sodium methylate in methanol. After twenty minutes, during which period the temperature was maintained between 53.5 and 59.0° C., the viscous solution was treated with 100 g. of a 1% solution of acetic acid in methanol. As this solution containing no added water was cooled to a temperature of 38° C. it turned to a strong but nearly transparent gel. The saponification number of the partially alcoholyzed polymer was 437, corresponding to a degree of alcoholysis of 49%.

When the experiment was repeated with the only change being that the acetic acid neutralizing agent was added as a 1% solution in 50% aqueous methanol, a product solution was obtained which did not gel when permitted to cool to room temperature. The partially alcoholyzed polymer had a saponification number of 425.6, corresponding to a degree of alcoholysis of 50.8%.

When the experiment was repeated a second time with the only change being that the acetic acid was added as a 1% aqueous solution, the product solution did not gel even when held at about 5° C. for twenty-four hours. The saponification number of the partially alcoholyzed polymer was 437.2, corresponding to a degree of alcoholysis of 49%

The foregoing examples illustrate the alcoholysis of polyvinyl acetates in accordance with the invention, since the polyvinyl acetates are the cheapest and the most important and most readily available of all the vinyl ester polymers. However, other vinyl ester polymers, such as the vinyl ester homopolymers and copolymers previously indicated, can be similarly partially alcoholyzed with generally similar results.

I claim:

1. In a method for preparing a partially alcoholyzed polymer of a vinyl ester of a 1 to 4 carbon aliphatic carboxylic acid wherein a solution of the vinyl ester polymer in an excess of a hydrolytic alcohol is subjected to alcoholysis under agitation in the presence of a strong acid or a base alcoholysis catalyst, the improvement comprising stopping the alcoholysis reaction when from 25 to 60% of the ester groups of said polymer have been replaced by hydroxyl groups by rapidly mixing with the reaction mixture a neutralizing agent for the catalyst and an amount of water which is equal to 5 to 55% of the weight of the reaction mixture and sufficient to facilitate such rapid mixing and to maintain the resulting partially alcoholyzed polymer as a mobile solution, said neutralizing agent being a water soluble alkaline reacting substance when said catalyst is an acid and a water soluble acid reacting material when said catalyst is a base.

2. A method according to claim 1 wherein a base alcoholysis catalyst is employed.

3. The method of claim 1 wherein the vinyl ester polymer is polyvinyl acetate, the hydrolytic alcohol is a 1 to 4 carbon primary aliphatic alcohol, a base alcoholysis catalyst is employed and the alcoholysis reaction is stopped when 40 to 55% of the ester groups of the polymer have been replaced by hydroxyl groups.

4. The method of claim 1 wherein the starting vinyl ester polymer solution is a 5 to 80 weight percent solution of polyvinyl acetate in methanol, the alcoholysis catalyst is sodium methylate, and acetic acid is the neutralizing agent.

5. The method of claim 1 wherein the starting vinyl ester polymer solution is a 20 to 65 weight percent solution of polyvinyl acetate in methanol, the alcoholysis catalyst is sodium methylate, acetic acid is the neutralizing agent, the amount of water employed is 10 to 50% of the weight of the reaction mixture, and the alcoholysis reaction is stopped when 40 to 55% of the ester groups of the polymer have been replaced by hydroxyl groups.

6. The method of claim 5 wherein approximately 50% of the ester groups of the polymer have been replaced by hydroxyl groups.

References Cited

UNITED STATES PATENTS

| | | | |
|---|---|---|---|
| 2,950,271 | 8/1960 | Snyder | 260—91.3 |
| 2,985,636 | 5/1961 | Anselm et al. | 260—91.3 |
| 3,028,374 | 4/1962 | Ehmann et al. | 260—91.3 |
| 3,050,508 | 8/1962 | Starck et al. | 260—91.3 |
| 3,066,121 | 11/1962 | Martin et al. | 260—91.3 |
| 3,400,915 | 9/1968 | Onishi et al. | 259—8 |

JOSEPH L. SCHOFER, Primary Examiner

C. A. HENDERSON, Jr., Assistant Examiner

U.S. Cl. X.R.

260—78.5, 85.7, 87.1, 87.3, 91.3